3 Sheets—Sheet 1.

H. C. MOORE,

Assignor of one-half interest to S. B. SHERER.

Road Scraper.

No. 9,417. Reissued Oct. 19, 1880.

WITNESSES:

Jas. E. Hutchinson

Henry C. Hazard

INVENTOR

Henry C. Moore, by

Geo. S. Prindle, his Atty

H. C. MOORE,

Assignor of one-half interest to S. B. SHERER.

Road Scraper.

No. 9,417. Reissued Oct. 19, 1880.

WITNESSES:

Jas. E. Hutchinson

Henry C. Hazard

INVENTOR:

Henry C. Moore, by

Geo. S. Prindle, his Atty

H. C. MOORE,

Assignor of one-half interest to S. B. SHERER.

Road Scraper.

No. 9,417. Reissued Oct. 19, 1880.

WITNESSES:
Jas. E. Hutchinson.
Henry C. Hazard.

INVENTOR.
Henry C. Moore, by
Geo. S. Prindle, his Atty

UNITED STATES PATENT OFFICE.

HENRY C. MOORE, OF TAMA CITY, IOWA, ASSIGNOR OF ONE-HALF OF HIS INTEREST TO SAMUEL B. SHERER.

ROAD-SCRAPER.

SPECIFICATION forming part of Reissued Letters Patent No. 9,417, dated October 19, 1880.

Original No. 207,977, dated September 10, 1878. Application for reissue filed July 21, 1880.

*To all whom it may concern:*

Be it known that I, HENRY C. MOORE, of Tama City, in the county of Tama, and in the State of Iowa, did invent certain new and useful Improvements in Road-Scrapers, for which Letters Patent No. 207,977 were issued to me upon the 10th day of September, 1878, which Letters Patent have been found defective in that the specification and claims do not cover and embrace all of the original invention, as set forth in the application filed in the Patent Office on the 27th day of March, 1878; now, therefore, being desirous of reissuing said Letters Patent, herewith surrendered, I have prepared, and do hereby declare, that the following is a full, clear, and exact description of the said invention, reference being had to the accompanying drawings, making a part of this specification, in which—

Figure 1:
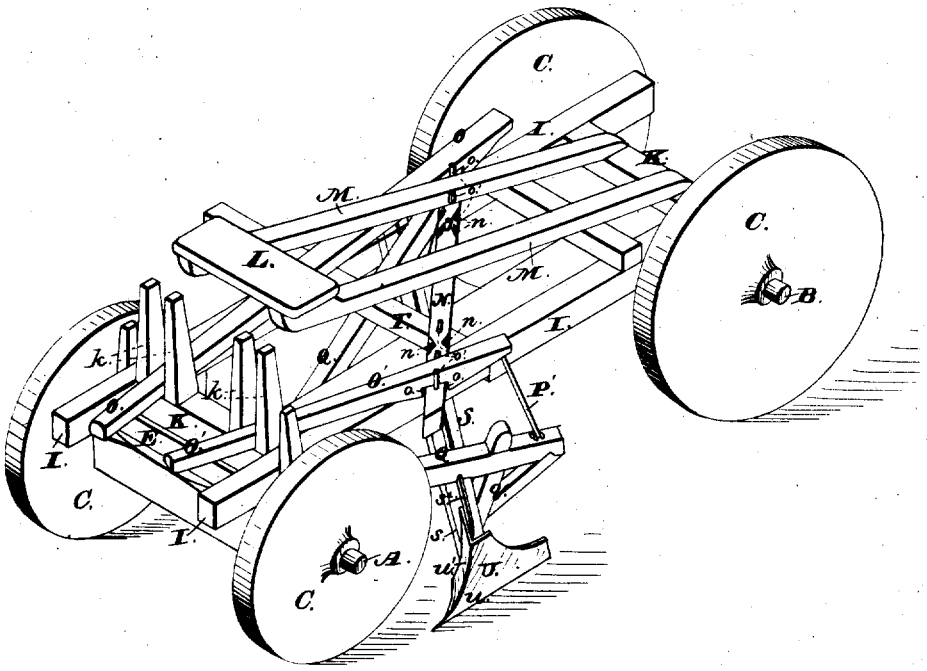
Figure 2:
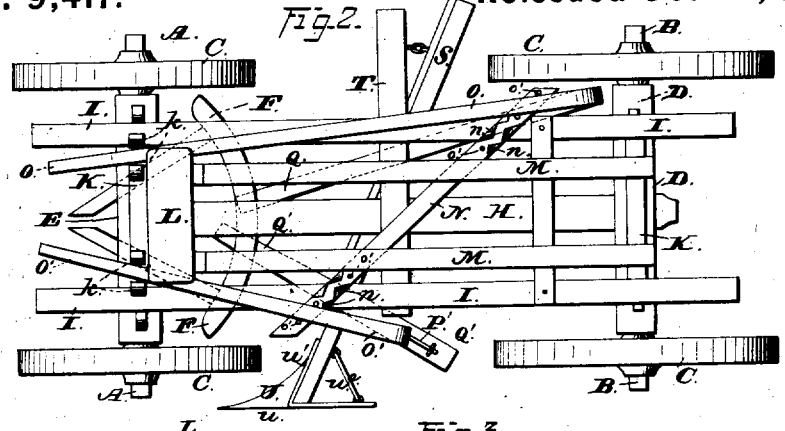
Figure 3:
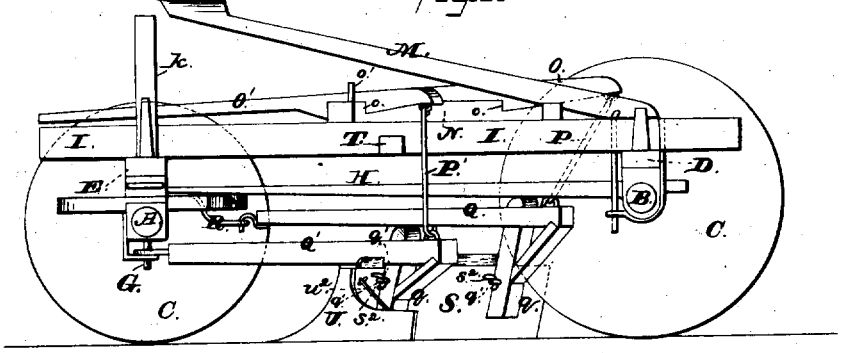
Figure 4:
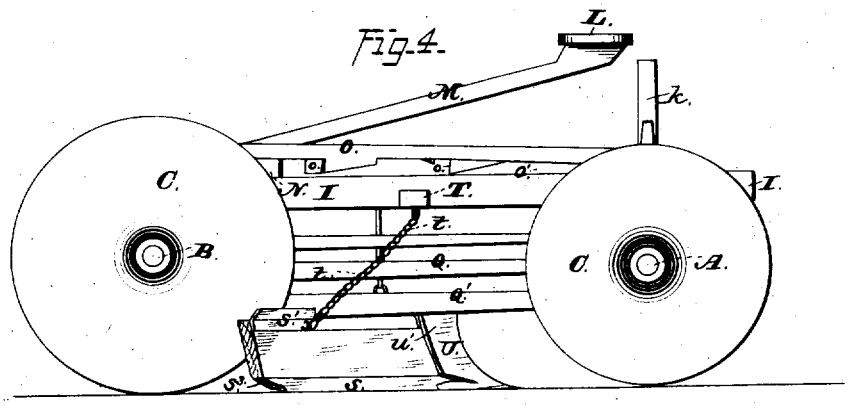
Figure 5:
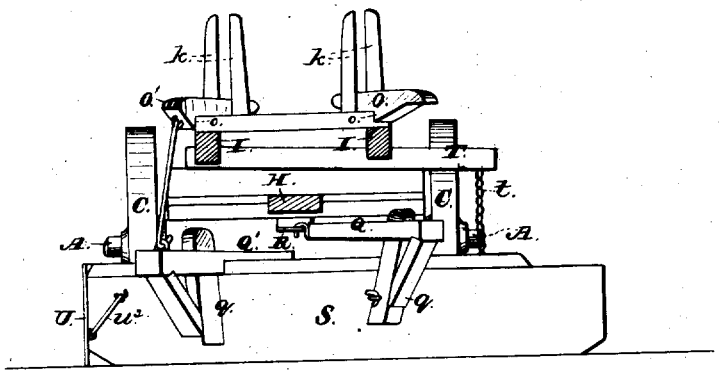
Figure 6:
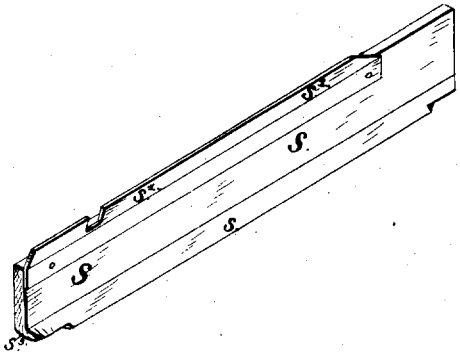
Figure 7:
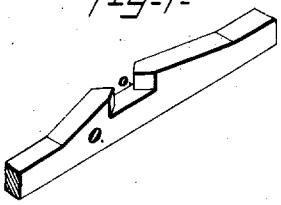

Figure 1 is a perspective view of my improved device as arranged for use. Fig. 2 is a plan view of the upper side of the same. Figs. 3 and 4 are elevations of opposite sides of said device. Fig. 5 is a rear elevation of the same, the rear axle and wheels being removed. Fig. 6 is a perspective view of the scraper detached from the machine, and Fig. 7 is a like view of the notched portion of one of the lifting-levers.

Letters of like name and kind refer to like parts in each of the figures.

The design of my invention is to furnish a convenient, efficient, and inexpensive means whereby the surface of a road can be leveled and trimmed to shape and grade; and to this end it consists, principally, in the means employed for connecting the scraper to or with the front axle, substantially as and for the purpose hereinafter shown.

It consists, further, in the means employed for adjusting vertically and independently the ends of the scraper, substantially as and for the purpose hereinafter set forth.

It consists, further, in the means employed for relieving the scraper from side pressure, substantially as and for the purpose hereinafter shown and described.

It consists, further, in the means employed for varying the lateral position of the scraper and plow, substantially as and for the purpose hereinafter shown.

It consists, further, in a scraper provided at suitable points upon or in rear of its cutting-edge with bearings, which operate to prevent said scraper from cutting into the soil below a certain predetermined depth, substantially as and for the purpose hereinafter set forth.

It consists, finally, in the construction and combination of the operative parts of the machine, substantially as and for the purpose hereinafter shown and described.

In the annexed drawings, A represents the front axle; B, the rear axle, and C four ground-wheels journaled upon the ends of the same. A bolster, D, rests upon and is rigidly secured to said rear axle, while above said front axle is the usual bolster E, connected therewith by means of a fifth-wheel, F, and king-bolt G.

Between the bolster D and king-bolt G extends a reach, H, while upon said bolsters rests a frame composed of two side bars, I, that are connected together at their ends by means of cross-bars K, the whole forming the running-gear of an ordinary farm-wagon.

A seat, L, for the driver, is supported upon the ends of two spring-bars, M, which are attached to or upon the rear end of the frame and extend forward and upward, as shown.

Secured diagonally upon the upper side of the bars I is a bar, N, which at each end projects beyond the contiguous bar, and at such point receives and sustains one end of a lever, O, that at its front end rests within or between two vertical guide-pins, *k*, which are secured within the cross-bar K. Said lever is provided upon its lower side with a notch, *o*, that has the form shown in Fig. 7, and has such horizontal dimensions as to cause it to loosely span said bar N. The ends of said notch have a Λ shape, so that their bearing upon the sides of said bar N is reduced to a minimum, and opportunity is afforded for lateral change in the position of the rear end of said lever.

In order to permit free vertical movement of the lever O the bar N is provided with notches *n* in its upper corners, which notches coincide with the line of said lever, and upon each side of each set or pair of notches is a stud or pin, $o'$, that extends upward and insures the lateral position of said lever.

Pivoted to the rear end, at the lower side of the longest lever O, is a rod, P, which from thence extends downward to, and is pivoted upon, the rear end of a plow-beam, Q. The front end of said beam Q is loosely pivoted to a metal bar, R, that extends from the king-bolt G rearward and downward below the fifth-wheel F. The opposite shortest lever, O′, is also connected with a second plow-beam, Q′, by means of a rod, P′, and the front end of said plow-beam is loosely pivoted upon the king-bolt G.

Against the front side of the standards $q$ is placed a scraper, S, which has the form shown in Fig. 6, its central portion being plane, while its lower edge inclines forward and downward and forms a cutter, $s$, and its opposite edge, $s'$, has a forward and upward inclination. Said scraper is connected with each standard $q$ by means of a hook, $s^2$, that is capable of turning so as to engage from below upward, or from above downward, with a staple, $q'$, that projects laterally from the side of said standard, such connection having sufficient flexibility to permit either end of said scraper, with its supporting mechanism, to be raised without interference with the opposite end.

As thus constructed the scraper S may be adjusted vertically at either or both ends by means of the levers O and O′, and when thus adjusted and the machine driven forward will cut off and throw to one side all soil which is above the line of its cutting-edge.

As the scraper S is arranged diagonally beneath the frame, the pressure of the soil will cause side draft, unless provision is made to prevent the same. Such provision is made by securing upon the lower side of the bars I a bar, T, which extends laterally across and slightly downward, and has its outer end at or near the rear end of said scraper. From the outer end of said bar T a chain, $t$, extends to and is connected with the front side near the upper edge of said scraper.

The bar T and chain $t$ receive the strain, which would otherwise cause side draft of the scraper S, and enable the same to perform its work in the most thorough and easy manner.

For use in some places it is desirable to employ a plow in connection with the scraper. Such plow U, I attach to the front end of the scraper S, its landside $u$ being at the end of the latter, while its mold-board $u'$ extends over and bears against the front side of the same. Suitable braces $u^2$ extend from the rear end of said landside $u$ to the rear face of said scraper, while bolts or any ordinary fastenings are employed for securing said mold-board in place.

The lateral position of the plow U is changed by moving the rear ends of the levers O and O′ in the desired direction within their pivotal bearings.

By means of the forward inclining upper edge, $s'$, of the scraper S the loose soil is rolled over and thrown forward, and eventually is discharged outside of the rear end of said scraper, instead of passing over the top of said scraper and falling upon the ground, as would otherwise be the case.

The flexible connections between the scraper and the machine give perfect freedom of movement, and enable said scraper to be adjusted to any angle to conform to the desired curvature of the road-bed.

In order that the scraper S may not run under or cut deeper than is intended, a flat portion, $s^3$, is provided at each end of the same, and operates as a bearing or shoe upon which said scraper rides. The amount of bearing-surface of each shoe is sufficient to enable it to successfully resist the downward draft of the cutting-edge $s$.

Having thus fully set forth the nature and merits of my invention, what I claim as new is—

1. The combination, with a carrying-frame supported by or upon wheels, of the plow-beams Q and Q′, pivoted, respectively, upon the bar R and king-bolt G, and the scraper S, flexibly connected with the standards $q$ of said beams, substantially as and for the purpose shown.

2. In combination with the beams Q and Q′, and with the scraper S, flexibly connected therewith, the levers O and O′, pivoted upon the bar N, and at their rear ends connected to or with said beams, substantially as and for the purpose set forth.

3. In combination with the scraper S, the bar T, projecting laterally and downward from the frame of the machine, and connected with said scraper by means of a chain, $t$, which extends between and is attached to said parts, substantially as and for the purpose shown and described.

4. In combination with the scraper S and plow U, lifting-levers O and O′, having each two or more laterally-arranged pivotal bearings, substantially as and for the purpose shown.

5. A road-scraper provided at suitable points upon its cutting-edge with bearings which operate to prevent said scraper from cutting into the soil below a certain predetermined depth, substantially as and for the purpose set forth.

6. In combination with the frame, supported upon or by means of wheels, the lifting-levers O and O′, the plow-beams Q and Q′, the connecting-rods P and P′, the scraper S, the plow U, the bar T, and the chain $t$, said parts being arranged substantially as and for the purpose shown and described.

In testimony that I claim the foregoing I have hereunto set my hand this 6th day of March, A. D. 1880.

HENRY C. MOORE.

Witnesses:
P. F. KEILY,
JNO. J. KEILY.